BEST AVAILABLE COPY

Feb. 13, 1951 M. BURTON Re. 23,338

RESETTING MEANS FOR PARKING METERS

Original Filed May 11, 1950 2 Sheets-Sheet 1

INVENTOR.
MARK BURTON
BY B. P. Fishburne
ATTORNEY

Feb. 13, 1951 M. BURTON Re. 23,338

RESETTING MEANS FOR PARKING METERS

Original Filed May 11, 1950 2 Sheets-Sheet 2

INVENTOR.
MARK BURTON
BY B. P. Schlemmer
ATTORNEY

Reissued Feb. 13, 1951

Re. 23,338

UNITED STATES PATENT OFFICE 23,338

RESETTING MEANS FOR PARKING METERS

Mark Burton, Perryton, Tex., assignor of one-half to Adlai S. Brillhart, Perryton, Tex.

Original No. 2,519,634, dated August 22, 1950, Serial No. 161,397, May 11, 1950. Application for reissue November 10, 1950, Serial No. 195,081

11 Claims. (Cl. 161—15)

Matter enclosed in heavy brackets [ ] appears in the original patent but forms no part of this reissue specification; matter printed in italics indicates the additions made by reissue

My invention relates to improvements in parking meters.

An important object of the invention is to provide means to automatically reset the indicator to the zero or starting position, when the parked vehicle leaves the space protected by the meter, in the event that the entire parking period has not been consumed.

A further object of the invention is to provide a vehicle actuated device of the above mentioned character which may be applied to the conventional parking meter now in use, without materially altering the construction of the same.

A further object of the invention is to provide resetting means which will shift the indicator slowly to avoid injury to the mechanism.

Other objects and advantages of the invention will be apparent during the course of the following description.

In the accompanying drawings forming a part of this application and in which like numerals are employed to designate like parts throughout same:

Figure 6:
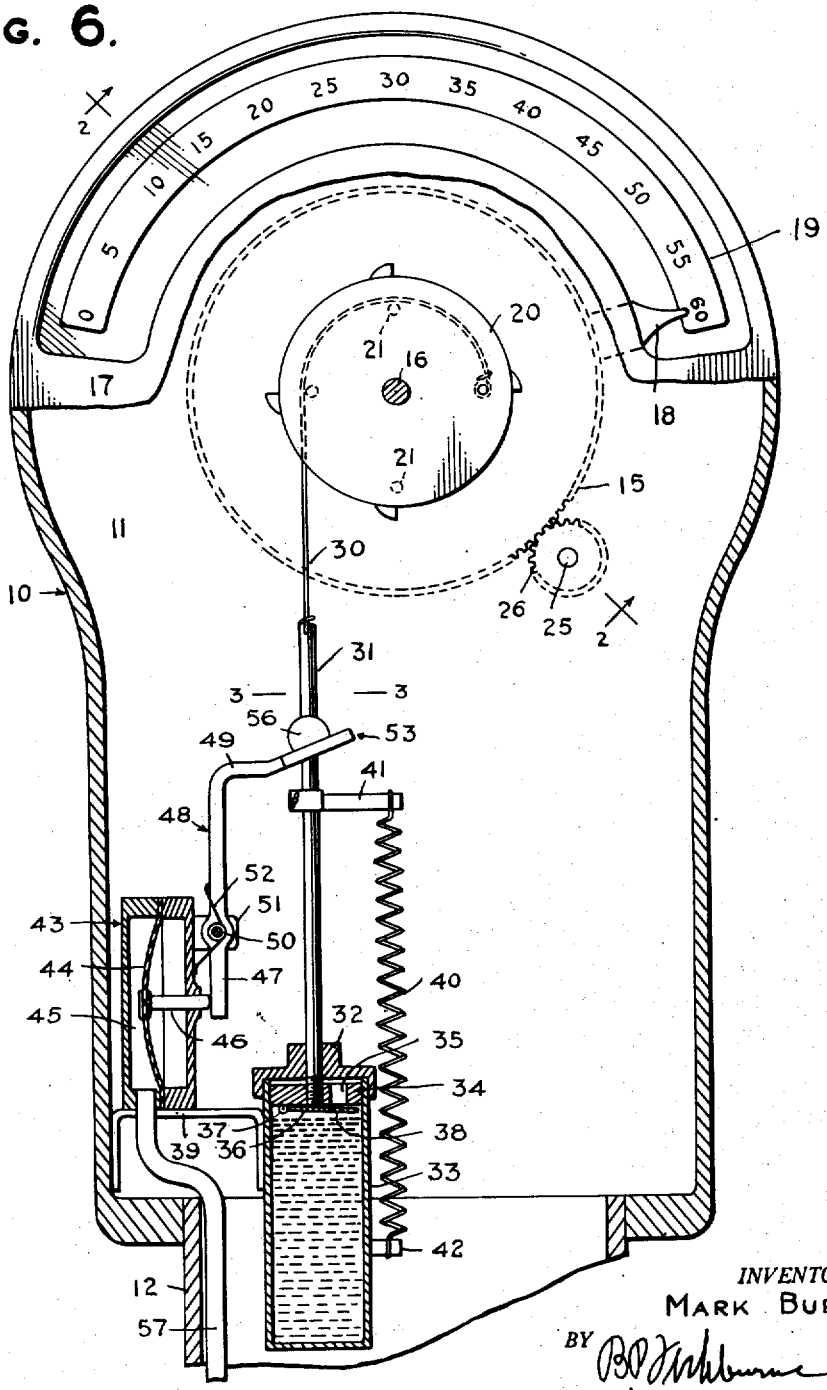
Figure 1:
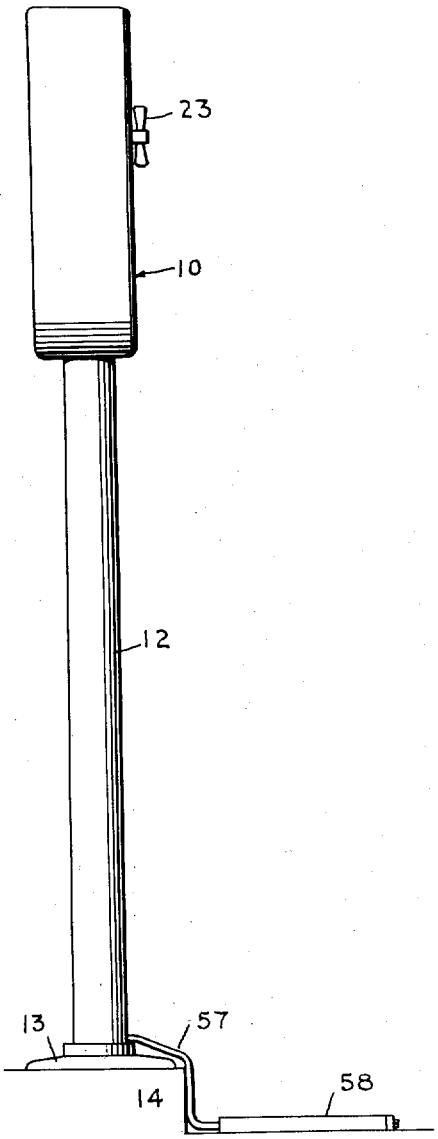
Figure 1 is a side elevation of a parking meter embodying my invention.
Figure 2:
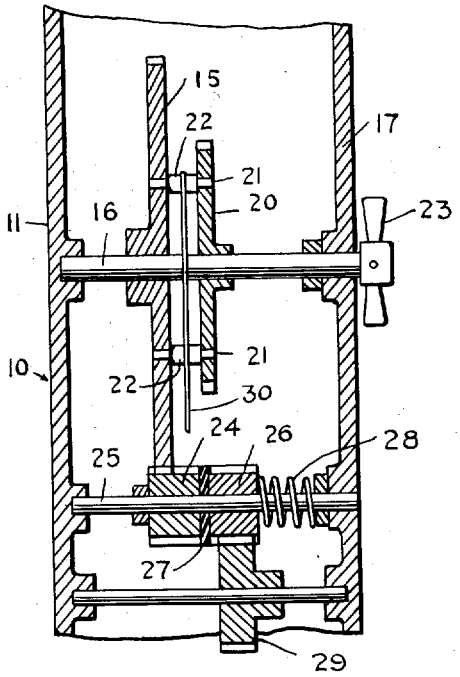
Figure 2 is a transverse section taken on line 2—2 of Figure 6.

In the drawings, the numeral 10 designates a vertical casing of the parking meter, and the back plate 11 may be removable. The meter casing 10 is mounted upon a tubular post 12, secured to a base 13, mounted upon the curb 14.

The operating mechanism of the meter comprises a large gear 15, rigidly mounted upon a horizontal shaft 16, mounted in suitable bearings carried by the casing, and extending outwardly beyond the casing front 17. An indicator or pointer 18 is secured to the gear 15, Figure 6, and travels in proximity to a stationary dial 19, which is graduated in units of time, ordinarily from zero to sixty minutes. The dial 19 is held stationary within the casing 10 and is visible through an opening in the front 17.

The numeral 20 designates a coin controlled disc, mounted upon the shaft 16 and spaced axially from the gear 15, and connected with the gear to turn therewith by pins 21, carrying spacers 22. The disc 20 is equipped with the usual teeth for coaction with the coin control element or elements. When the pointer 18 is in the starting or zero position, disc 20 is locked against turning movement, and upon the insertion of a proper coin, disc 20 is released and the pointer 18 manually turned clockwise, Figure 6, to bring it to the sixty minute position. This may be effected by turning a handle 23 manually, and this handle is arranged exteriorly of the casing front 17 and is secured to the shaft 16, to turn it.

When the indicator 18 is at the sixty minute position, clock works acts upon the gear 15 to turn it counter-clockwise, Figure 6, so that the indicator 18 is returned to the zero or starting position. In order that this may be accomplished, a small gear 24 engages the large gear 15 and is mounted upon a horizontal shaft 25, journaled in suitable bearings carried by the casing 10, and held against longitudinal movement upon the shaft 25. A companion gear 26 is slidable upon the shaft 25 to turn and move longitudinally with relation thereto, and a friction clutch element 27 is arranged between the adjacent ends of the gears 24 and 26. A coil spring 28 shifts the gear 26 toward the gear 24. The gear 24 drives the gear 15, and gears 24 and 26 turn as a unit to move the indicator 18 toward the zero position, when the gear 26 is driven by the clock works. The clock works may include a train of gears including gear 29, a spring motor and escapement mechanism. When the indicator 18 is to be shifted from the zero position to the sixty minute position, the handle 23 and shaft 16 is turned clockwise, Figure 6, and slippage will occur between the gears 24 and 26, the gear 24 turning with respect to the gear 26, which is held against any considerable turning movement by the clock works. When the indicator 18 is shifted by my resetting device from the sixty minute position to the zero position, slippage also occurs at the friction clutch element 27, between the gears 24 and 26.

I have not described nor shown the coin control mechanism nor the clock works in detail, as it is unnecessary for a proper understanding of the present invention. The parking meter thus far described is substantially conventional.

I provide means actuated by the wheel of the automobile to turn the gear 15 and reset the indicator 18 to the zero position when moved therefrom. This means comprises a flexible element or cable 30 attached to the disc 20 by any suitable means. This flexible element 30 may be arranged between the gear 15 and disc 20 and secured to one of the pins 21, and engaging over the other pins 21. This flexible element extends downwardly and is attached to a vertical reciprocatory rod 31, operating through an opening in a head 32, carried by a vertical cylinder 33, included in a dash-pot. A plunger 34 is secured to the lower end of the rod 31, and has a large opening 35 extending through opposite ends thereof. This large opening is covered and uncovered by a flap valve 36, arranged beneath the plunger 34 and pivoted thereto at 37. This flap valve seats upwardly and has a restricted opening 38. The cylinder 33 is filled with a fluid, such as oil. When the plunger 34 moves upwardly, flap valve 36 opens and the liquid may pass freely through the large opening 35. When the plunger 34 moves downwardly, flap valve 36 covers large opening 35 and the liquid must then pass through the restricted opening 38 which will cause the plunger 34 to travel downwardly slowly. The cylinder 33 is held stationary by any suitable means and may be secured to the bracket 39, attached to the casing 10. The cylinder is arranged within the casing 10, as shown.

The rod 31 is moved downwardly when released by a retractile coil spring 40, the upper end of which is secured to an arm 41 rigidly mounted upon the rod 31, and its lower end secured to a lug 42, attached to the lower end of a cylinder 33.

The numeral 43 designates a stationary casing of a fluid pressure operated element, including a flexible or resilient diaphragm 44, forming a chamber 45 behind it. This diaphragm is connected with a reciprocatory plunger 46, engaging the lower end of the vertical arm 47 of a bell-crank lever 48, having a horizontal arm 49. The vertical arm is pivoted at 50 to swing in a vertical plane upon a support 51, which may be mounted upon the casing 43. The resilient diaphragm 44 will bias the plunger 46 to the left or inwardly, and the bell-crank lever 48 is biased clockwise, Figure 6, by a spring 52.

Figure 3:
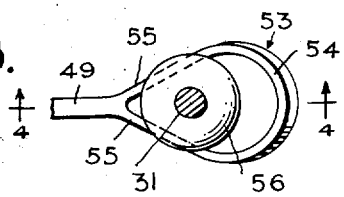
Figure 3 is a horizontal section taken on line 3—3 of Figure 6.
Figure 4:
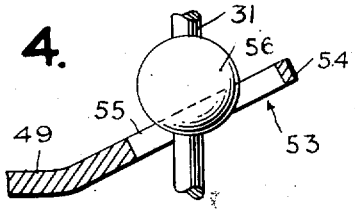
Figure 4 is a longitudinal section taken on line 4—4 of Figure 3.

Formed integral with the horizontal arm 49 is a loop 53, including a curved end 54, and sides 55, which diverge toward the curved end 54. The loop 53 is inclined upwardly toward the large or curved end 54. A stop element or ball 56 is rigidly mounted upon the rod 31, and is adapted to be arranged above the loop 53, to engage with the diverging sides 55, and hence held against downward movement through the loop 53. When the loop 53 is swung counter-clockwise, Figures 3, 4 and 6, the large or curved end 54 is shifted toward the ball 56 and the ball will disengage diverging sides 55 and pass through the loop, so that the spring 40 may shift the rod downwardly. When the ball 56 is held above the inclined diverging sides, the downward pull upon the rod 31 tends to swing the bell-crank lever 48 clockwise, Figure 6, more securely locking the ball to the sides 55. When the ball 56 is beneath the inclined diverging sides 55, the upward movement of the ball 56 will swing the bell-crank lever counter-clockwise, and hence the diverging sides 55 will move from the ball 56 and the ball may pass through the loop to assume a position above the loop. This occurs when the handle 23 is turned clockwise to shift the indicator 18 to the sixty minute position.

Figure 5:
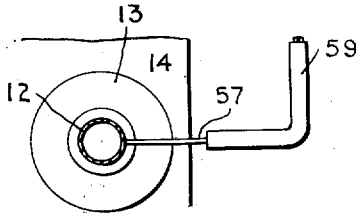
Figure 5 is a plan view of a modified form of wheel-engaging compression element, and, Figure 6 is a side elevation of the resetting mechanism, parts in section.

Leading into the chamber 45 is a copper pipe 57, which may extend down through the tubular post 12, and be connected with a compressible element 58, which may be a section of rubber hose having its opposite end closed. This hose will be of a straight length when parallel parking is permitted and will be at right angles to the curb 14. The hose 58, pipe 57 and chamber 45 are filled with a fluid, such as air, or they may be filled with a liquid, such as oil. It is thus seen that when the automobile wheel runs over the hose 58 it will be compressed and the air or fluid forced up into the chamber 45, to move the diaphram 48 to the right, Figure 6. When diagonal parking is permitted, the L-shaped hose 59, Figure 5, will be used.

The operation of the apparatus is as follows: With the parts arranged as indicated in Figure 6, the indicator 18 has been shifted to the sixty minute position and the car parked in the parking space. The clock works is now turning the gear 15 counter-clockwise, Figure 6, while the rod 31 is held raised. Slack will now occur in the flexible element 30. Assuming that the automobile is driven from the parking space when the indicator 18 reaches the thirty-five minute position, as an illustration, then the wheel of the automobile will compress the hose 18 and the compressed air or fluid will be forced into the chamber 45, and the bell-crank lever 48 will be swung counter-clockwise. Ball 56 can now pass downwardly through the loop and the spring 54 will move the plunger 34 downwardly, but this movement will be slow due to the action of the dash-pot. The downward movement of the rod 31 will first take up the slack in the flexible element 30 and then pull the flexible element to turn the wheel 15 and indicator 18 counter-clockwise, Figure 6, to bring the indicator to the zero position. This counter-clockwise turning movement is rendered possible by the friction clutch connection between the gears 24 and 26, and the spring 40 is sufficiently strong to cause the clutch to slip. The plunger 34 will remain in the lowered position until the handle 23 and shaft 16 is turned clockwise, Figure 6, at which time the flexible element raises the rod 31 and the ball passes upwardly through the loop 53 and again becomes locked upon the sides 55 above the loop.

It is to be understood that the form of my invention herewith shown and described is to be taken as a preferred example of the same and that various changes in the shape, size, and arrangement of parts may be resorted to, without departing from the spirit of my invention or the scope of the subjoined claims.

Having thus described my invention, I claim:

1. The combination with the turning element of a parking meter, of a pulling element connected with the turning element, a spring connected with the pulling element to move it in one direction, a stop secured to the pulling element, a pivoted control member to engage with the stop and shiftable with relation to the stop to let the stop pass, and pressure operated means to actuate the pivoted control member including a compressible element to be engaged by the wheel of the vehicle.

2. In a parking meter, a pivoted member, an indicator operated by the pivoted member, means connected with the pivoted member to move it in one direction, means connected with the pivoted member to move it in an opposite direction including a friction clutch, a pull element connected with the pivoted member to move it in the said opposite direction, a spring to move the pull element in one direction, a latch device for holding the pull element against movement by the spring, and pressure operated means to release the latch device including an element to be compressed by the wheel of an automobile.

3. In a parking meter, a pivoted member, an indicator operated by the pivoted member, means connected with the pivoted member to move it in one direction, means connected with the pivoted member to move it in an opposite direction including a releasable device, a pull element connected with the pivoted member to move it in the said opposite direction, a spring to move the pull element in one direction, a dashpot connected with the pull element to cause the same to move slowly in response to the action of the spring, a latch device for holding the pull element against movement by the spring, and pressure operated means to actuate the latch device to release the pull element including an element to be compressed by the wheel of an automobile.

4. A device for resetting the movable element of a parking meter, said device including a reciprocatory rod, means to guide the rod in its movement and connect it with the movable element, a stop mounted upon the rod, a movable element supported near the rod and including diverging arms to engage the stop and which are vertically inclined, and pressure operated means to move the second-named movable element including a compressible element to be actuated by the wheel of the automobile.

5. A device for resetting the movable element of a parking meter, said device comprising a reciprocatory rod, means to guide the rod in its movement, means connecting the rod and movable element, a ball mounted upon the rod, a spring connected with the rod to move it in one direction, a pivoted lever arranged near the rod and including a loop, said loop including diverging arms for coaction with the ball, said arms being inclined, and pressure operated means to move the lever.

6. A device for resetting the movable element of a parking meter, comprising a substantially vertically reciprocatory rod, guide means for the rod, a flexible element connecting the rod and movable element, a spring connected with the rod to move it downwardly, a stop mounted upon the rod, a vertically swinging bell-crank lever arranged near the rod and having a substantially horizontal arm, an inclined loop carried by the arm and including diverging sides for coaction with the stop, and pressure operated means to operate the bell-crank lever.

7. A device for resetting the movable element of a parking meter, said device comprising a substantially vertical cylinder, a plunger to reciprocate within the cylinder and having a large opening, a flap valve carried by the plunger to cover the large opening and having a restricted opening to communicate with the large opening, a substantially vertical rod extending above the cylinder and connected with the plunger, a spring connected with the rod and the cylinder to move the rod downwardly, a ball mounted upon the rod, a flexible element connecting the rod and movable element, a pivoted bell-crank lever arranged near the rod and including a generally horizontal arm, a loop receiving the rod and including diverging sides to coact with the ball and being vertically inclined, and pressure operated means to move the bell-crank lever.

*8. In a parking meter, a movable operating member, an indicator shifted by the operating member, means connected with the operating member to move it in one direction, means connected with the operating member to move it in an opposite direction including a friction clutch, a pull element connected with the operating member to move it in said opposite direction, pull means connected with the pull element to move it in one direction, a releasable latch device for holding the pull element against movement by the pull means when the latch device is active, and means to operate the latch device to render the same inactive and release the pull element.*

*9. A device for resetting the movable element of a parking meter, said device comprising a pull element having a stop member, pull means connected with the pull element to move it in one direction, a pivoted lever arranged near the pull element and provided with inclined diverging arms for coaction with the stop member, vehicle actuated means to move the lever, and means to move the movable element of the meter in an opposite direction to the movement caused by the pull element.*

*10. A device for resetting the movable element of a parking meter, said device comprising a reciprocatory rod, means to guide the rod in its movement, means connecting the rod and movable element, a ball mounted upon the rod, a spring connected with the rod to move it in one direction, a pivoted lever arranged near the rod and including a loop, said loop including diverging arms for coaction with the ball, said arms being inclined, and vehicle actuated means to move the lever.*

*11. A device for resetting the movable element of a parking meter, said device comprising gear means operated by clock works to move the movable element in one direction, a pull element connected with the movable element to move th same in the same direction as caused by the gear means, pull means to move the pull element in one direction, a latch device separate from the gear means and free from engagement with the gear means and when active serving to hold the pull element against movement by the pull means, means to move the pull element in an opposite direction to that caused by the pull means, and vehicle actuated means engaging the latch device to render the same inactive.*

MARK BURTON.

REFERENCES CITED

The following references are of record in the file of this patent or the original patent:

UNITED STATES PATENTS

| Number | Name | Date |
|---|---|---|
| 2,096,155 | Breeden | Oct. 19, 1937 |
| 2,229,183 | Mitchell | Jan. 21, 1941 |
| 2,264,479 | Munson | Dec. 2, 1941 |